United States Patent [19]

Harbeke

[11] Patent Number: 4,748,787

[45] Date of Patent: Jun. 7, 1988

[54] PIPE FLANGE FIRE-PROOFING KIT AND PROCESS

[76] Inventor: Gerold J. Harbeke, 2807 S. Military Trail, West Palm Beach, Fla. 33415

[21] Appl. No.: 881,547

[22] Filed: Jul. 2, 1986

[51] Int. Cl.$^4$ .............................................. E04B 5/48
[52] U.S. Cl. ........................................ 52/741; 52/221; 52/232; 52/577; 264/31; 285/64
[58] Field of Search ................. 52/232, 317, 220, 221, 52/577, 699; 285/219, 58, 64; 264/31

[56] References Cited

U.S. PATENT DOCUMENTS

| | | | |
|---|---|---|---|
| 1,603,245 | 10/1926 | Pederson | 52/221 |
| 3,047,930 | 8/1962 | Doyle | 25/118 |
| 3,048,911 | 8/1962 | Almon | 25/118 |
| 3,421,551 | 1/1969 | Currier | 285/58 |
| 3,678,634 | 7/1972 | Wise et al. | 52/232 |
| 3,800,486 | 4/1974 | Harvey | 52/98 |
| 4,071,265 | 1/1978 | Wallace | 285/158 |
| 4,136,707 | 1/1979 | Gaillot et al. | 52/232 |
| 4,221,092 | 9/1980 | Johnson | 52/232 |
| 4,261,598 | 4/1981 | Cornwall | 285/56 |
| 4,270,318 | 6/1981 | Carroll et al. | 52/232 |
| 4,272,643 | 6/1981 | Carroll et al. | 174/48 |
| 4,307,546 | 12/1981 | Dolder | 52/232 |
| 4,313,286 | 2/1982 | Harbeke | 285/64 |
| 4,427,173 | 1/1984 | MacKay | 249/39 |
| 4,432,465 | 2/1984 | Wuertz | 52/232 |
| 4,453,354 | 6/1984 | Harbeke | 52/220 |
| 4,619,087 | 10/1986 | Harbeke | 285/64 |

FOREIGN PATENT DOCUMENTS 2615428 10/1977 Fed. Rep. of Germany .

Primary Examiner—Carl D. Friedman
Assistant Examiner—Michael Safavi
Attorney, Agent, or Firm—Griffin, Branigan, & Butler

[57] ABSTRACT

A pipe flange fire-proofing kit and process for forming a cast-in fire-stop coupling from normal pipe (22) includes a flange member (10) which is separate from the normal pipe, annularly-shaped top and bottom spacer collars (12 and 14), and an annularly-shaped fire barrier collar (16). Each of these members is slid onto a pipe stub (24) cut from a normal pipe with the top spacer collar being at a top end thereof, the bottom spacer collar being at a bottom end thereof, the fire-barrier collar of intumescent material being immediately adjacent the bottom spacer collar, and the flange member being between the fire barrier collar and the top spacer collar. The flange member is adhered to the pipe stub by an adhesive. The stub is attached to a concrete form wall (44,54) onto which concrete (42,52) to form a barrier is poured, with its bottom end and the bottom spacer being immediately adjacent the form wall so that upon curing of the concrete the top and bottom spacer collars can be removed so that female couplings can be attached to top and bottom ends of the pipe stub with the fire-barrier collar being open to air from the bottom side of the barrier. The pipe stub is attached to the form walls either by attaching members (50) extending from the flange member to the form wall or by a compression column extending from the form wall through the pipe stub to the top end of the pipe stub.

3 Claims, 1 Drawing Sheet

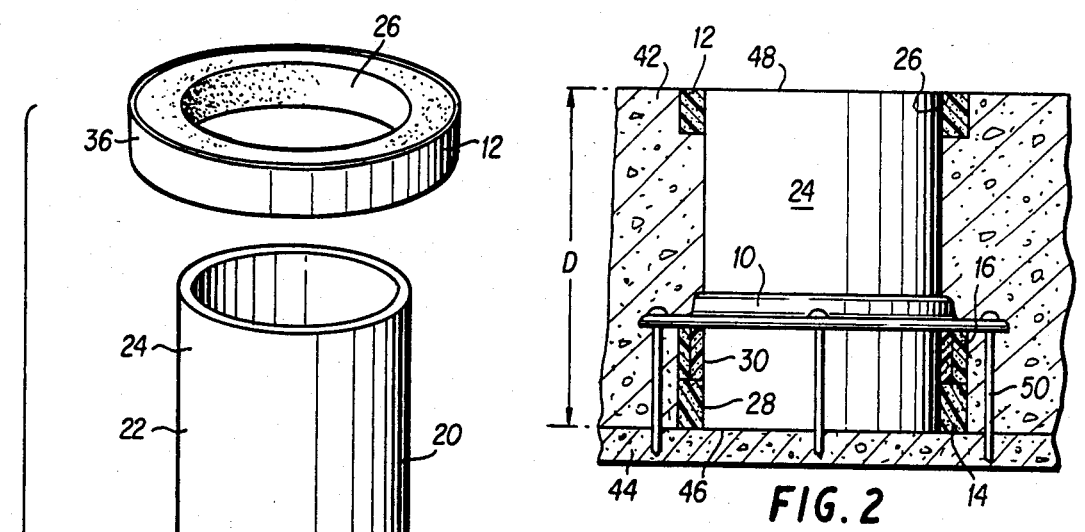
FIG. 2
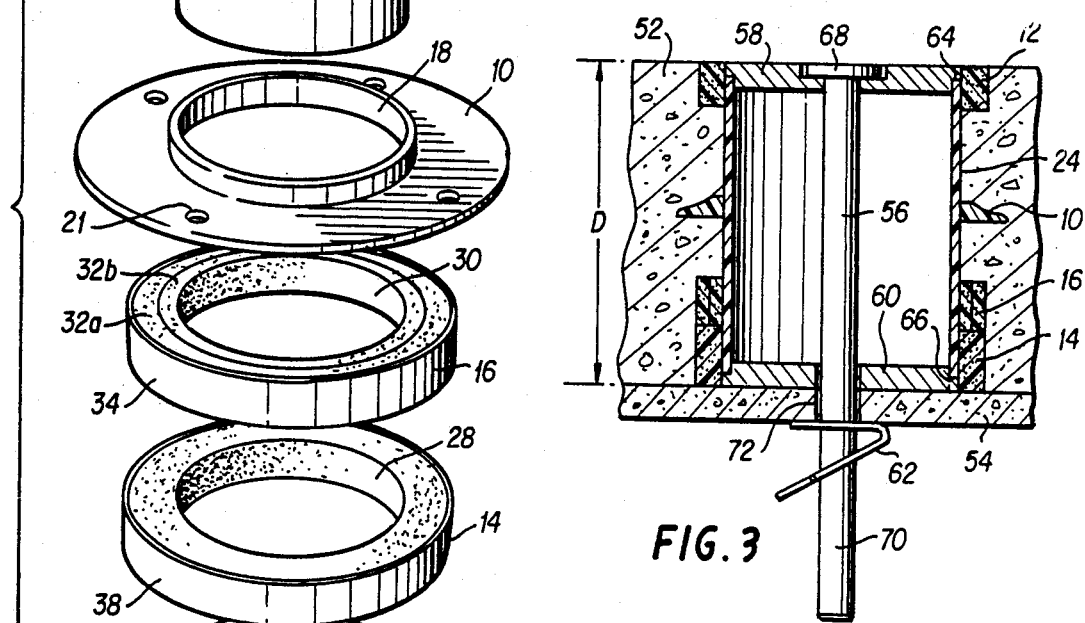
FIG. 1
FIG. 3
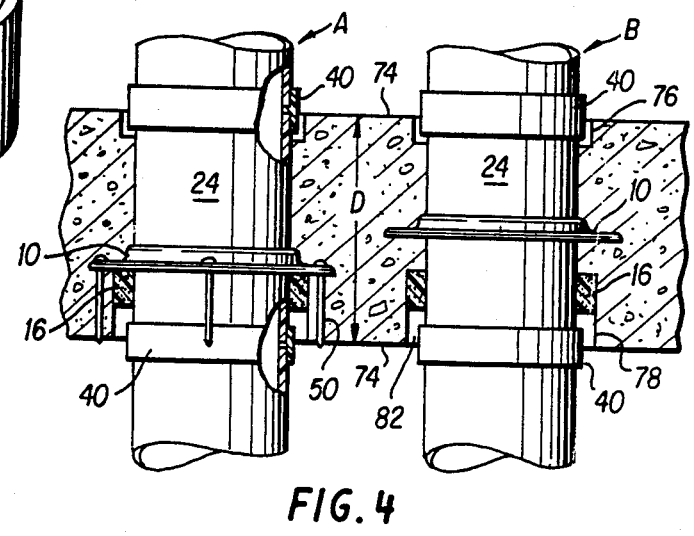
FIG. 4

PIPE FLANGE FIRE-PROOFING KIT AND PROCESS

BACKGROUND OF THE INVENTION

This invention relates generally to the art of pipe networks for buildings and especially to apparatus and methods for embedding pipes in floors and walls and making fire-retardant pipe networks.

Until recently, pipe networks were normally extended through floors of buildings by formings holes in the floors —e.g. by using void-forming devices during the "pouring" of the concrete floors, by knocking out holes, by boring such holes after the floors had been formed, etc. —and thereafter extending pipes through these holes. Normally, the holes were made to be bigger than the pipes to ensure that one could easily extend the pipes through the holes. Thereafter, it was necessary for workmen to fill the spaces between the pipes and the floors with cement or some other substance to meet fire codes which generally do not allow holes in floors.

There have been a number of patents and other U.S. documents published such as German Offenlegungsshrift No. 2,615,428, U.S. Pat. No. 4,453,354 to Harbeke, and U.S. Pat. No. 4,261,598 to Cornwall disclosing the concept of cementing pipe coupling joints into floors when the floors are poured (sometimes called "cast-in couplings" ) and thereafter, mating external pipes to female opposite ends of the thusly embedded coupling joints. Such a practice is normally carried out with plastic pipes, however, it could also be carried out with pipes made of other materials. A difficulty with these specialized pipe-coupling joints is that they are relatively expensive, they are sometime difficult to cut to be proper lengths for various concrete-pour thicknesses, and most of them do not prevent the spread of fire from a lower story to a higher story. It is an object of this invention to provide a method and kit which allows one to construct a "cast-in" coupling from a pipe stub cut from normal, inexpensive, pipe to be a proper length for a desired concrete-pour thickness which retards the spread of fire between stories.

With regard to the "spread of fires", a major problem which still exists for plastic pipe-coupling joints which are embedded in floors is that when there is a fire, the fire melts external plastic pipes and then pass up through the embedded pipe-coupling joints themselves to the next higher floor. In other words, the embedded, or "cast-in" pipe coupling joints themselves serve as ventilation holes for fires. It has been suggested, and some fire codes require, that intumescent material surround plastic pipes where they pass through floor barriers. Upon being heated by a fire in the story below, the intumescent material will swell, thereby compressing the plastic pipe closed at the floor barrier and prevent the fire from spreading through the floor barrier. However, many of the embedded, "cast-in", coupling joints are thicker than regular pipe and many of them overlap pipes coupled from opposite ends along practically their entire lengths. Thus, intumescent material surrounding such embedded pipe joints would have to compress the thicker pipe coupling joint and in some cases would also have to compress the pipe itself before it could close off the pipe. It will be appreciated that compression through so much thickness of plastic is much more difficult than if the intumescent material were only compressing one normal pipe itself. Thus, it is an object of this invention to provide a kit and process for preparing an embedded pipe coupling joint which allows intumescent material to be placed about a normal, one-layer, pipe at a floor barrier.

In addition, many prior art embedded pipe coupling joints have flanges at their bottom ends which are used to attach the coupling joints to floor cement forms. Once the forms are removed these flanges serve as barriers to prevent heat from rising along the joints to contact intumescent material wrapped thereabout and thereby delay the heating of the intumescent material and its swelling. Thus, it is a further object of this invention to provide a kit and process for preparing an embedded pipe coupling joint from a stub cut from normal pipe which is surrounded by intumescent material which is open to atmosphere from the story below so that it can quickly receive heat therefrom.

It is a further object of this invention to provide a kit and process for making a fire-retardant fluid coupling which acts quickly enough to prevent a fire from spreading to the next higher story through a bore of the fluid coupling.

It is still another object of this invention to provide a kit and process for making such a fire-retardant fluid coupling which can be easily mounted on a concrete form wall for embedding the coupling in concrete.

SUMMARY

According to principles of this invention, a kit and process allow a pipe stub cut from normal pipe to be used to form a fire-stop coupling joint embedded in a concrete barrier. The kit and process involve the use of a flange member which is separate from the normal pipe, but which defines a flange hole therethrough for snugly receiving the outer surface of the pipe stub to be adhered thereto at a selected position along the pipe stub. The process and kit also involve the use of an annularly-shaped top spacer collar and an annulary-shaped bottom spacer collar which are respectively positioned on the stub at its top and bottom ends. Still further, the process and kit involve the use of an annularly-shaped fire-barrier collar of intumescent material which is positioned on the pipe stub immediately adjacent the bottom spacer collar. The flange member is positioned between the fire barrier collar and the top spacer collar. The stub is attached to a concrete form wall onto which concrete to form a floor barrier is poured, with its bottom end and the bottom spacer being immediately adjacent the form wall. Upon curing of the concrete the top and bottom spacer collars are removed and female/female pipe couplings are attached to the top and bottom ends of the pipe stub for receiving further pipes from above and below the floor barrier. The fire-barrier collar is open to air from the bottom side of the floor barrier since the bottom spacer collar has a substantially greater outer diameter than the female/female pipe coupling. The stub can be attached to the form wall by means of the flange.

BRIEF DESCRIPTION OF THE DRAWINGS

The foregoing and other objects, features and advantage of the invention will be apparent from the following more particular description of the preferred embodiment of the invention, as illustrated in the accompanying drawings in which reference characaters refer to the same parts throughout the different views. The drawings are not necessarily to scale, emphasis instead being placed upon illustrating principles of the invention in a clear manner.

FIG. 1 is an exploded view of the elements of a kit according to principles of this invention along with a pipe stub cut from normal plastic pipe and a standard female/female coupling joint;

FIG. 2 is a partially cutaway, partially sectional, side view of an embedded pipe coupling joint prepared with the kit of this invention mounted on a concrete-form wall using the process of this invention with concrete poured thereabout prior to removal of spacer collars;

FIG. 3 is a partially sectional, side view of a pipe coupling joint mounted, using the kit and process of this invention, on a concrete-form wall in a second embodiment manner; and, FIG. 4 is a partially sectionalized, partially cutaway, side view showing two pipe coupling joints mounted in a floor barrier using the kit and process of this invention, with the pipe stub thereof being attached to female/female coupling joints and further pipes being attached to the female/female coupling joints.

DESCRIPTION OF THE PREFERRED EMBODIMENT

Looking at the drawings, a kit of this invention includes a separate, annularly-shaped flange 10, top and bottom spacer collars 12 and 14, and an annularly-shaped fire barrier collar 16. The flange 10 has an opening 18 therein for snugly receiving the exterior surface 20 of a normal plastic pipe 22. In this respect, the kit is specialized to a particular size of plastic pipe, for example, to two inch pipe, three inch pipe, four inch pipe, etc. The flange 10 is also constructed of the same type plastic polymers as is normal plastic pipe such as PVC or ABS. The flange 10 is snugly slidable along the outer surface of an appropriate normal pipe 22 and can be adhered thereto using a pipe adhesive (e.g. solvent weld) at any point along the pipe. Nail or screw holes 21 pass through the flange 10 near its outer edge in the axial direction for purposes to be described below. The flange extends radially approximately one inch from the opening 18 to its outer perimeter, and the holes 21 are located ¾ inch from the opening 18.

With regard to the pipe 22, the kit and process of this invention are used with a pipe stub 24 cut from the normal pipe 22 to be a length which is the same as the depth (or thickness) of a concrete "pour" as will be described below.

The top and bottom spacer collars 12 and 14 are constructed of a frangible material, such as STYROFOAM, and also include central openings 26 and 28 for snugly receiving the same size normal pipe as the opening 18 of the flange 10. It is not necessary to adhere the top and bottom spacer collars 12 and 14 to the pipe stub 24 as is the flange 10, as they will be held thereto by friction. Spacer collars 12 and 14 have radial thicknesses of a little more than one half inch and are about 1 ¾ inches long in the axial direction. The top and bottom spacer collars can be identical, however, this is not necessary. As will be explained below, the top spacer collar 12 must be at least as thick as normal female/female coupler while the bottom spacer collar 14 must be significantly thicker than this.

The fire-barrier collar 16 also has a central opening 30 therein which snugly receives the pipe stub 24. Again, this member is not normally adhered to the pipe stub, however, it holds thereto by friction. The fire-barrier collar 16 is approximately two inches in width (axial direction), and is also approximately ½ inch thick (radial direction). The fire-barrier collar 16 is constructed of layers 32A and 32B of intumescent material wrap. In a preferred embodiment, these layers are constructed of a fire-barrier strip/wrap FS-195 manufactured by 3M of St. Paul, MN, however, they can also be of caulk #CP25 or puddy 303, both of which are also manufactured by 3M. Again, its thickness and height are designed to expand such that it closes off the internal bore of the pipe stub 24 when it swells. Each layer 32A and 23B of the fire barrier wrap is approximately ¼ inch thick. For a 3 inch internal diameter pipe 22, two layers of intumescent material wrap are required. For a 2 inch pipe one layer is required and for a 4 inch pipe three layers are required. An outer layer 34 of tape forms a protective and supporting coating for the intumescent material to protect it from damage and to hold it together. Normally, the top and bottom spacer collars 12 and 14 will also have outer protective layers 36 and 38 formed of tape for protecting them and holding them together. A plastic, normal, female/female coupling 40 is shown in its proper position relative to the pipe stub 24, however, this member is not used until a "cast-in" coupling joint has already been embedded in concrete and the bottom spacer collar 14 has been removed from the pipe stub 24 as will be further explained below.

Describing now the method and manner of use of the kit of this invention, FIG. 2 depicts a first embodiment wherein a fire-stop cast-in coupling joint is prepared in a concrete floor barrier 42 according to the principles of this invention. The pipe stub 24 is cut to a length D which is the same as the depth, or thickness, of the concrete barrier 42. In preparation of such a coupling joint, a pipe stub 24, after being cut to a proper length from normal pipe 22, is inserted through central openings 26, 18, 30, and 28, respectively, of the top spacer collar 12, flange 10, fire-barrier collar 16, and the bottom spacer collar 14 in that order from top to bottom. The flange 10 is adhered to the outer surface of the pipe stub 24 using a normal plastic-pipe adhesive, or solvent weld, which is well known in the art. In this respect, the bottom spacer collar 14 is positioned immediately adjacent lower end 46 of the pipe stub 24, the fire-barrier collar 16 is positioned immediate adjacent the bottom spacer collar 14, and the flange 10 is adhered to the pipe stub 24 immediately thereabove. The top spacer collar 12 is located at the top end 48 of the pipe stub 24.

In the FIG. 2 embodiment the lower end of the pipe stub 24 is then placed against the top surface of a cement form 44 at a location where a pipe is to pass through the concrete barrier 42 and long screws 50 passing through holes 21 of the flange 10 are screwed into the form 44 for holding the flange 10, and the attached pipe stub 24, with its collars, thereto. Wet concrete is then poured into the concrete form 44 and allowed to cure thereby becoming the concrete barrier 42. Once the concrete 42 has cured, the form 44 is removed and the top and bottom spacer collars 12 and 14 are removed. Since the spacer collars 12 and 14 are frangible, they can be "dug out" where necessary. Thereafter, standard female/female coupling joints 40 are attached to top and bottom ends of the pipe stub 24 as is depicted in embodiment A of FIG. 4. The screws 50 are left in the concrete and their ends can be cut off or bent.

FIG. 3 depicts another embodiment of the method of this invention wherein the pipe stub 24 is cut from normal pipe to be slightly shorter than the depth D of a concrete 52 pour. In this embodiment, the top spacer collar 12, flange 10, the fire-barrier collar 16 and the bottom spacer collar 14 are again positioned on the outer surface of the pipe stub 24 in the same order as for the FIG. 2 embodiment. However, in the FIG. 3 embodiment, top and bottom spacer collars 12 and 14 are extended slightly beyond the top and bottom ends of the pipe stub 24 and the flange 10 can be positioned anywhere along the pipe stub 24, not necessarily close to the bottom end thereof in the manner of the FIG. 2 embodiment. The reason for these differences is that the pipe stub 24 and its collars and flange are held to a form wall 54 by means of a compression column 56, outer and inner plates 58 and 60, and a spring fastener 62. The compression column 56 passes through holes in the outer and inner plates 58 and 60 and the outer and inner plates 58 and 60 have notches 64 and 66 about their outer peripheries for receiving top and bottom ends of the pipe stub 24. A head 68 on the compression column 56 engages the outer plate 58 and, when a lower end 70 of the compression columns 56 is pulled downwardly through a hole 72 in the form wall 54, pulls the pipe stub 54 firmly against the form wall 54. Thus, the pipe stub and its attachments are mounted on the form wall 54 using the spring fastener 62, the compression column 56 and the outer and inner plates 58 and 60. Once the concrete 52 has cured and the compression column 56, outer and inner plates 58 and 60 and the form wall 54 have been removed, the top and bottom spacer collars 12 and 14 are also removed. The flange 10, being adhered to the pipe stub 54 by an adhesive prevents the pipe stub 24 from slipping relative to the concrete 52 and falling out of the concrete. Again, normal plastic female coupling members 40 are attached to opposite ends of the pipe stub 24 as is depicted in embodiment B of FIG. 4. As in the A embodiment, the female/female couplings 40 can be attached to the stub 24 below surfaces 74 of the concrete because of spaces 76 and 78 which were left by the top and bottom spacer collars 12 and 14.

It will be appreciated by those of ordinary skill in the art that the normal, standard, female coupling 40, which is only about 3/16 inch thick, fills very little of the space 78 left by the ½ inch thick bottom spacer collar 14 thereby allowing heat rising from a story 80 therebelow to enter through an opening 82 to contact the intumescent material of the fire-barrier collar 16. Those of ordinary skill in the art will also notice that the fire-barrier collar 16 encircles only one layer of normal pipe, that is the pipe stub 24, and can easily swell to close off the internal bore thereof.

While the invention has been particularly shown and described with reference to preferred embodiments, it will be understood by those skilled in the art that various changes in form and detail may be made therein without departing the spirit and scope of the invention. For example, the top spacer collar 12 need not be as thick as the bottom spacer collar 14 inasmuch as the top spacer collar 12 need only leave sufficient room for a normal female/female plastic coupling. The bottom spacer collar 14, on the other hand, must be quite thick in order that it form the opening 82 about a normal female/female coupling 40 to allow air and heat from the story below 80 access to the fire-barrier collar 16.

Another modification of the method and kit of this invention is that under certain circumstances it is possible not to use a top spacer collar 12 but rather instead to place a normal female/female coupling 40 at the top end 48 of the pipe stub 24 before the pipe stub and its attachments are attached to a concrete form. This is possible where the depth D of the pour is sufficiently great that a top end of a normal female coupling 40 can still be at a top surface of the pour. It is normally important that nothing extend above the top surface of the concrete pour that might interfere with machinery which works the top surface of the concrete.

Still another possible modification of the invention is that the flange 10 and a bottom spacer 14 could be used to form a cast-in coupling joint which is not a fire retardant joint, that is, without the fire-barrier collar 16. In this manner, flange 10 is mounted above the bottom spacer collar 14. The stub 24 is held to a form either by screws passing through the flange 10 as shown in FIG. 2 or by a compression column 56, as shown in FIG. 3, and after the form is removed, stub 24 is then attached at its lower end to a normal female coupling 40. The top end of such a stub could be prepared using a top spacer collar 12 or a normal female coupler 40 attached thereto prior to the pour, depending on the length of the pipe stub 24.

It will be appreciated by those of ordinary skill in the art that the method and kit of this invention allow normal pipe to be used to create cast-in joints of any depth pours. Further, they provide a form support for the stub, a riser for holding the stub in the concrete, and a fire barrier all in a single operation. In addition, this invention eliminates the need for providing an external shroud on a pipe fire barrier. The bottom spacer collar 14 forms an air passage exposing the fire-barrier collar 16 to open flame and heat.

The embodiments of the invention in which an exclusive property or privilege are claimed are defined as follows:

1. A method of preparing a cast-in pipe joint from standard pipe at a work site for embedding said cast-in pipe in a pour of concrete to be made to a particular depth, and of using said cast-in pipe joint after the curing of said concrete, said method comprising the steps of:

cutting a pipe stub from standard pipe to be of a length approximately the same as the depth of a concrete pour to be made, said pipe stub having a top and bottom end;

sliding a flange member which is separate from said pipe stub onto said pipe stub to be intermediate the top and bottom ends thereof, said flange member having a hole therethrough for receiving and sliding on a fixed-circumference outer surface of said standard pipe, and selectively adhering said flange member to said pipe stub with an adhesive along the length thereof intermediate the top and bottom ends thereof;

sliding an annularly-shaped bottom spacer collar onto said pipe stub and positioning it at the bottom end of said pipe stub, said spacer collar having a bottom-collar opening of a size and shape for snugly receiving the fixed-circumference outer surface of the standard pipe and having a radial outer perimeter of a size substantially larger than a radial outer perimeter of a female coupler to be attached to the bottom end of said pipe stub but smaller than the outer perimeter of said flange member;

attaching said pipe stub to a concrete form wall onto which concrete to form a barrier is poured with said pipe stud bottom end being adjacent the form wall by engaging elongated attaching members between said flange and said concrete form wall at a position beyond the perimeter of said spacer collar;

whereby said flange member is used to hold said pipe stub to said form wall during the pouring and curing of said concrete and as a protruding element to hold said pipe stub in said concrete after the curing of said concrete and removal of said concrete form wall;

after removal of said form wall, removing said bottom spacer from the bottom end of said pipe stub and attaching said bottom end to a pipe coupling joint.

2. A method as in claim 1, wherein is further included the step of sliding an annularly-shaped fire barrier collar of intumescent material onto said pipe stub between said flange member and said bottom spacer, said collar of intumescent material defining a fire barrier opening therethrough of a size and shape for snugly receiving said fixed-circumference outer surface of said standard pipe and having a sufficient size such that when said intumescent material is heated and is restrained about its outer periphery it will expand and essentially close off an inner bore of said pipe stub positioned in said fire barrier opening;

said fire barrier collar and said bottom-spacer collar being adjacent one another at a bottom end of the stub such that upon curing of the concrete and removal of the bottom spacer collar the fire-barrier collar is open to air and heat from the bottom side of the barrier through an opening formed in the concrete by the bottom spacer collar.

3. A method as in claim 1, wherein is further included the step of sliding an annularly-shaped top spacer collar onto said pipe stub, said top spacer collar having a top-collar opening of a size and shape for snugly receiving said fixed-shaped circumference outer surface of said standard pipe and having an outer perimeter of a size at least as great as a radial outer perimeter of a female/female coupler to be attached to the top end of said pipe stub;

whereby said top spacer collar is immediately adjacent the top end of said pipe stub when concrete is poured into said form and upon curing of the concrete and removal of the top spacer a normal female/female pipe coupling can be attached to the top end of the pipe stub.

* * * * *